Figure 1:
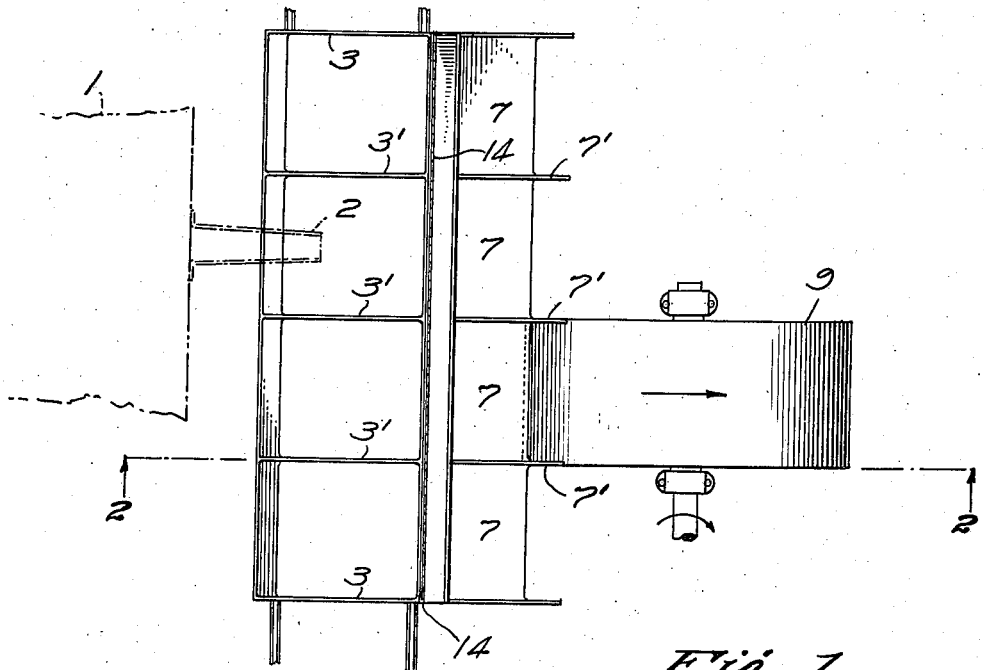

March 7, 1939.  F. R. KEMMER  2,149,608
METHOD OF PRODUCING CYANIDE
Filed June 22, 1934

INVENTOR
FRANK R. KEMMER
BY
John P. Chandler
HIS ATTORNEY.

Patented Mar. 7, 1939

2,149,608

UNITED STATES PATENT OFFICE 2,149,608

METHOD OF PRODUCING CYANIDE

Frank R. Kemmer, Larchmont, N. Y.

Application June 22, 1934, Serial No. 731,806

12 Claims. (Cl. 23—79)

As a means of producing cheap cyanide compounds for use in the mining industry, more especially in the leaching and extraction of the precious metals such as gold and silver from aqueous solutions, it was proposed some thirty years ago to heat calcium cyanamid with carbon and a suitable metallic chloride to a suitable temperature.

It was then stated that a suitable proportion of ingredients consists of one part of cyanamid of calcium and two parts of sodium chloride. It was further stated that a larger or smaller proportion of sodium chloride could be chosen and it was suggested that too large a proportion be avoided in order that the product obtained should not be too low in its calcium cyanide content. The mechanism of the reaction was the simple one,

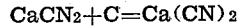

$$CaCN_2+C=Ca(CN)_2$$

This process, because of the proportion of salt used and for other reasons not well understood at the time, did not yield a product sufficiently concentrated in its calcium cyanide content to permit it to compete, at that time, with high grade alkali metal cyanides.

In later years and more especially under the handicaps of embargos, lack of shipping facilities, and the stimulus of high prices which resulted from the world conflict, renewed efforts were directed to the manufacture of cyanide by using calcium cyanamid or what was technically known as lime nitrogen, by heating this with sodium chloride which was used as a flux to keep the finished product in a fused condition in order to tap it from the smelting furnace.

In view of the earlier use of alkali metal cyanides in industry, trade usage has developed a nomenclature whereby cyanides are quoted or expressed in terms of the chemically equivalent sodium cyanide. Thus commercial 46% calcium cyanide has its strength expressed as 49% equivalent sodium cyanide and I shall hereafter, throughout this application, express the strength of my calcium cyanide product in terms of its sodium cyanide equivalent.

Commercial calcium cyanide as heretofore produced is of low grade compared with the commercial grade of sodium cyanide which contains 96 to 98% NaCN. It also contains a large amount of impurities. It passes into aqueous solution slowly and imparts a dirty reddish brown color to the solution and leaves a slimy residue therein. High grade sodium cyanide, however, dissolves in water with rapidity to a perfectly clear solution. For these reasons many mines continue to use high grade sodium cyanide in spite of its higher cost.

Obviously it would be of great advantage to be able to produce calcium cyanide of higher quality than the present commercial grade, and it is among the objects of my invention to improve the grades and quality of cyanides, such as calcium cyanide.

I accomplish this in several different ways.

One of the features of my invention consists in filtering off impurities which are carried in suspension in molten solutions, such as a solution of calcium cyanide in sodium chloride. The possibility of improving the quality by filtration was suggested by what appears to be a peculiar condition or state of the molten product as it is tapped from the smelting furnace. It then behaves in a peculiar manner in that it does not flow smoothly and resembles in its physical appearance a condition characteristic of a suspension of fine ice crystals in water. I have found this slushy or slurry like condition to be due to the presence of insolubles suspended in the molten product and I believe them to consist principally of lime sometimes with smaller amounts of magnesia, carbon, and oxides and sulphides of iron, silicon, aluminum and calcium.

Another feature of my invention consists in the fortifying of the molten cyanide product, preferably after filtration. This is accomplished by contacting the molten product with a suitable substance, such as calcium cyanamid, or the like, at a sufficiently high temperature to transform the cyanamid into cyanide which dissolves in the salt. A substantially saturated solution may thus be obtained. The fortifying may take place simultaneously with filtration and the filter medium may be cyanamid, which may thus have a double function.

It has, I believe, been generally held that calcium cyanide is a very unstable product between temperatures of 1300° C. and 400° C. and that above 1300° C. and below 400° C. it is a stable product. I am led to doubt the correctness of this belief. It is my opinion that temperature or temperature range, per se, is not the important or critical factor governing the stability of calcium cyanide. It is my opinion that calcium cyanide is a stable product not only above about 1300° C. and below about 400° C., but also between these temperatures, provided it is brought into a state of solution and maintained in that condition. This theory seems to accord with and explain certain facts which on other grounds are difficult to explain and it is my belief that the stability of calcium cyanide is due primarily to its being dissolved in a solvent and that it loses its stability and reverts to cyanamid only when the melt has become saturated, and under conditions which permit calcium cyanide to be thrown out of solution. Therefore, when I cool a calcium cyanide solution in a molten salt, which was saturated with the cyanide at say 1400° C., I prefer to cool the same quickly down to substantially room temperature to obtain a solid, supersaturated solution without throwing any material amount of the cyanide out of solution during the cooling.

I have been led to this opinion as a result of observations that when crude calcium cyanide is filtered so as to remove its insoluble impurities that the filtered product containing 50% equivalent sodium cyanide is a very clean limpid molten solution at temperatures materially below 1300° C. and that this 50% product was stable in spite of the fact that it had not been chilled from 1300° C. and in spite of the fact that chilling was not rapid even from a substantially lower temperature in the sense in which this term has been used in the literature, because some product which flowed over a long runner and was then cast into a sand bed was quite stable. The evidence was such as to cause me to discard the general belief that calcium cyanide stability depends on temperature per se and to seek a new and more logical theory. According to my theory calcium cyanide, if in solution, is stable whatever the temperature.

The importance of my theory will be better understood in connection with the two aforesaid features of my invention for improving the grade of calcium cyanide.

The advantages of my invention will be obvious in that for the first time it discloses methods whereby calcium cyanide in alkali metal-halogen salt solution may be produced of higher grade than has been considered possible heretofore and, moreover, if my theory is correct, my invention should make it possible to produce the ultimate attainable quality in calcium cyanide for any specific solvent.

In the manufacture of the present commercial grade of calcium cyanide containing about 49% equivalent sodium cyanide, a very high grade of cyanamid is desired. In those countries not favored with the highest quality of raw materials for cyanamid production, particularly in many European and in the Far Eastern countries, it is not practicable by present methods to produce a grade of calcium cyanamid sufficiently high in nitrogen and low enough in impurities to produce cyanide containing the equivalent of 49% sodium cyanide. It is one of the most important advantages of my process that these low grades of cyanamid containing 21% and less nitrogen may now be used not only as a raw material for commercial cyanide production but furthermore that they may serve to produce calcium cyanide of ever higher grade than the highest quality cyanide yet produced by the cyanamid-salt fusion process when using cyanamid with upwards of 24% nitrogen and of lower content of impurities.

Another advantage of my invention is that the apparatus required to carry it out is of very simple design, inexpensive to construct and can be so arranged as to easily and cheaply treat large quantities of cyanide of commercial or lower grade. This is of considerable advantage where the method and apparatus are to be used in conjunction with smelting units already installed.

A substantial economic advantage of my invention is that I may produce a calcium cyanide product substantially in excess of the present commercial grade without high losses of nitrogen which result when efforts are made to produce grades higher than 50% equivalent sodium cyanide content in the smelting furnace and in a single operation.

By virtue of the removal of the impurities and the clean condition of the melt I am enabled to withdraw from what might be termed my finishing or saturating apparatus the much higher grade of product produced therein and which would not be possible by present methods when the impurities, principally from the crude cyanamid, are associated therewith.

Figure 2:
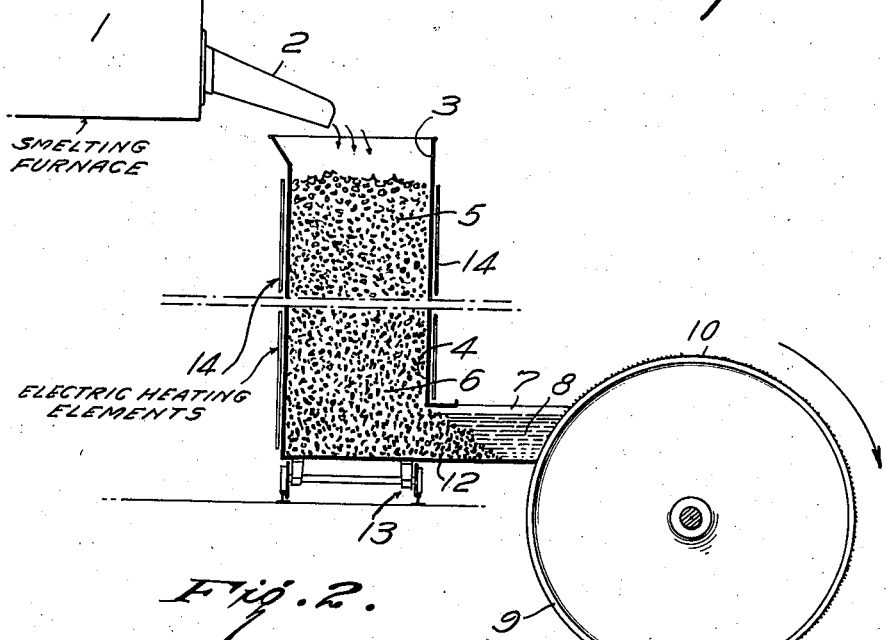

In the accompanying drawing, Figure 1 is a plan view of an apparatus in accordance with my invention, and Figure 2 is an elevational view with some parts shown in transverse section.

I provide a smelting furnace 1 in which a mixture of crude calcium cyanamid containing carbon in an amount sufficient to form cyanide and an alkali metal-halogen salt is melted to produce a product containing calcium cyanide which after it is tapped flows down the runner 2 onto a bed of filtering material 5 retained in chamber 3 and thence passes through suitable material 6 retained in chamber 4 wherein the filtered product dissolves additional quantities of calcium cyanamid and carbon, converting the same into cyanide, and thereby becoming fortified in calcium cyanide, if so desired up to the point of saturation of the fused solvent at the temperature used.

The filtered and fortified liquid 8 may be caused to accumulate in the collecting basin 7 from which it may be picked up and chilled to room temperature on the chilled surface of rotating wheel 9, from which the chilled product 10, is removed by a scraper 11 or other suitable device.

The filtering and fortifying media are preferably carried in super-imposed positions in compartments grouped together and mounted on a suitable truck 12, designed to be moved through suitable traction means 13, so that the smelting, filtering, fortifying and chilling operations may be carried out continuously on a large scale and without stoppage for renewal of the filtering medium and spent fortifying reagents.

The filtering and fortifying apparatus is maintained at suitable temperatures in its respective parts preferably by electric heating elements 14 mounted on refractory walls not shown on the drawing, between which the apparatus is caused to move as it becomes necessary to shift the truck so as to provide new and fresh filtering and fortifying media to treat the product from the stationary smelting furnace. In some cases the temperature of the lower chamber may be maintained at a higher temperature than the filter medium, say 1400° C. in order to increase the solubility of the cyanide in the solvent, and in the presence of cyanamid and carbon the solvent will take up sufficient thereof to give a substantially saturated cyanide solution by conversion of the cyanamid to cyanide.

As a specific example of the advantages to be derived in the practice of my invention I may treat a solution of calcium cyanide in sodium chloride of a strength of 48 to 50% equivalent sodium cyanide by passing it through granular carbon as a filtering medium and on the assumption that I filter off only the principal insoluble, lime, I should obtain a product containing approximately 56% equivalent sodium cyanide.

If one uses sodium fluoride in lieu of sodium chloride by substitution of molecule for molecule and on the basis of equal molecular solubility, the filtered product in such a case should run upwards of 62% equivalent sodium cyanide.

The sodium chloride of my filtered solution is, however, generally substantially below its ultimate saturation point, at the temperature used, for calcium cyanide. In general the degree of saturation of the solution will be about 1.20 to 1.40 pounds of equivalent sodium cyanide per pound of sodium chloride but it may be more or less than these amounts. It is now possible by the second feature of my invention to very substantially improve the grade of calcium cyanide by augmenting the degree of saturation of the solvent up to about 2 pounds or even more of equivalent sodium cyanide per pound of sodium chloride. I am not certain as yet what the upper limit of solubility of sodium chloride for calcium cyanide is, but my belief is that it may well be considerably in excess of two pounds.

Assuming, however, that I start with crude calcium cyanamid containing 24% nitrogen as cyanamid nitrogen and sufficient carbon to convert all the contained calcium cyanamid to calcium cyanide, then 100 pounds of crude cyanamid would contain $$24 \times \frac{80}{28} = 68.5$$

pounds $CaCN_2$ which would produce 78.75 pounds of $Ca(CN)_2$. The associated materials or impurities in the cyanamid, therefore, which are inert as cyanide producing substances, amount to 21.25 pounds. By using just sufficient salt to realize a degree of saturation of two pounds of calcium cyanide per pound of sodium chloride there would be required 39.37 pounds of sodium chloride and my final product would consist of

| | | |
|---|---|---|
| $Ca(CN)_2$ | 78.75 lbs. | |
| NaCl | 39.37 lbs. | |
| Inerts | 21.25 lbs. | |
| Total | 139.37 lbs. | 139.37 lbs. |
| Less assumed insolubles filtered off | 13.37 lbs. | 16.37 lbs. |
| Filtered and fortified product | 126.00 lbs. | 123.00 lbs. |
| Percent $Ca(CN)_2$ | 62.5% | 64.0% |
| Percent equivalent NaCN | 66.5% | 68.1% |

It is probable that more than the aforesaid amounts of impurities are insoluble and filterable and/or that the degree of saturation may be carried to a point in excess of 2 pounds of equivalent sodium cyanide per pound of sodium chloride, then obviously one may well realize a product containing upwards of 70% or more of calcium cyanide when using sodium chloride as the solvent.

Furthermore, other, though at present perhaps more expensive, solvents than NaCl may be used and where such solvents indicate greater solubility of calcium cyanide per unit of weight the quality of the final product will be even higher than that indicated above for sodium chloride, and assuming equal molecular solubility it should be possible, for example, when using sodium fluoride, to realize percentages corresponding to the last two figures indicated above for NaCl of 72.8% and 74.8% respectively of equivalent sodium cyanide.

Among the advantages of my improved calcium cyanide product I find that it now goes into aqueous solution more readily and with absence of the slimy residue which results from the present commercial grade of 48% to 50% equivalent sodium cyanide content.

My new product, instead of being a grayish black to black color, which is characteristic of the 48% to 50% commercial grade, is found to be a light gray to grayish white color. It is also harder and of greater density and under the microscope shows greater freedom from pores and freedom from that spongy texture characteristic of the commercial grade. My product also resists decomposition or disintegration over a longer period than the present product. The reason for this is most likely that my product is substantially free from CaO, which is highly hygroscopic and attracts water from the air, which would act to decompose the $Ca(CN)_2$, such as occurred in the old product.

Other advantages suggest themselves in that smaller containers may be used and savings in freight effected. This is of considerable importance because cyanides are transported to mining regions in remote and difficultly accessible mining projects in many parts of the world, at times being transported by mule back at the end of long water and rail hauls.

Still other advantages are apparent as for example in the manufacture of hydrocyanic acid wherein the product as at present produced contains much lime which serves to consume sulphuric acid used in its manufacture. Smaller apparatuses may be used and present equipment will have greater capacity, thus materially reducing the cost of repairs and replacements.

In the use of cyanide for case hardening my improved product is of considerable benefit and advantage in that deposits of lime, carbon, etc. which formerly built up in the cyanide pots from the impurities in the cyanide are minimized greatly with considerable economy in the use of cyanide.

For direct fumigation my process offers a more concentrated product which obviously is capable of producing higher toxic contentrations of HCN in a given time and the new product has, therefore, better insecticidal value. The new product is also better adapted for the manufacture of other cyanides, particularly those required to be of a high degree of purity for electrolytic purposes.

Over a long period considerable thought and attention has been given by investigators to the question of making sodium cyanide from crude calcium cyanide. Some recent investigators have succeeded technically at least in accomplishing this result. Commercially, however, the impurities in the crude calcium cyanide as heretofore produced offer serious obstacles and in this respect and for this purpose my product offers many advantages. It is likewise found to be a more suitable material in the manufacture of prussiates and hydrocyanic acid because of the absence of insolubles, the higher content of cyanogen, the greater ease of handling, the saving of reagents, the increased capacity of apparatus, etc.

The cyanide present in the composition of the present invention is calcium cyanide as will be seen from page 163 of the book by Franck, Makkus and Janke, entitled "Der Kalkstickstoffin Wissenschaft, Tecknik und Wirtschaft" (1931) wherein it is shown by X-ray analysis that the material is definitely calcium cyanide and does not contain sodium cyanide.

Although I have described my process with reference to the treatment of calcium cyanide and have expressed percentages thereof in terms of equivalent sodium cyanide, I do not wish my methods to be limited to the treatment of calcium cyanide alone. It will be understood that the treatment described may be applied to low grade sodium cyanide or other fused cyanides or to mixtures of cyanides containing insolubles and which are capable of being filtered and/or fortified in the manner described herein.

Likewise I do not wish to be limited to the particular means of heating my filtering and fortifying compartments, efficacious as these means may be, because obviously other means will readily suggest themselves to those skilled in the art.

The ultimate percentage of calcium cyanide in the final product from my fortifying process will, according to my belief and theory, depend principally on the character of the solvent which is used and the ultimate fortifying temperature. As a fortifying substance crude calcium cyanamid, with or without minor additions of carbon and/or calcium carbide, may be used, but generally the results are quite satisfactory without any additions of other materials to the crude cyanamid. I do not, however, wish to be limited to the use of this fortifying reagent alone because obviously other means, which may appear at the moment, for economic or technical reasons, to be less promising for producing calcium cyanide in the presence of a molten solvent, may be used.

As calcium cyanamid decomposes appreciably at about 1350° to 1400° C. it is my present belief that the ultimate temperature at which the fortifying operation should be conducted should not exceed about 1400° C. but I do not wish to be strictly limited to this temperature because it may be possible by my method to recapture any nitrogen which may be split off and which would to a large extent become lost in other processes.

While I may use as a filtering medium other refractory materials which will withstand the operating temperature and corrosive action of alkali halogen salts, I prefer to use those materials which are in general closely related to the principal raw materials entering into the production of the cyanide, namely, calcium cyanamid, such as carbon in its various forms and preferably of low sulphur content and lime, but I do not of course limit myself to these materials alone.

When using crushed coke as the filtering medium I have found this to work satisfactorily in the form of the general run of product passing an 8 mesh screen. It is obvious, however, that I may grade the coke into various sizes and may place these in separate layers and obviously I may change the sizes used and their position in the filtering bed in a variety of ways without departing from the spirit of the invention.

While I may use such solvents as sodium chloride and sodium fluoride separately, the former generally alone on account of its cheapness and the latter in special cases requiring maximum solubility per unit weight of solvent, I may of course use mixtures of these as solvent or mixtures of any combination of suitable solvents for calcium cyanide. The use of NaF is advantageous in that it has a much higher boiling point than NaCl.

I generally prefer to chill the product on a suitable rotating wheel but in the case where the product is desired in granular or globular form, I may blast it with a stream or with jets of cold nitrogen under pressure and in that instance I preferably carry the fortifying process up to the limit of saturation of my solvent for the particular temperature at which I choose to operate.

Whereas in the combined filtering and fortifying apparatus shown in the drawing, the walls are shown as vertical, I do not wish to be limited to this construction as these may be tapered for example so as to have a thinner dimension at top or bottom as desired with a view to more rapid heat penetration in some parts of the apparatus than in others and this is merely one way in which the operation may be suitably controlled and regulated.

Whereas I have indicated in the drawing accompanying this specification filtering and fortifying units in combination, and consisting of individual compartments containing a layer of filtering medium superimposed on a layer of calcium cyanide forming reagents, I do not wish to be limited to this arrangement as I may superimpose these media in alternative layers in any desired number and of varying depths and within wide limits as to size and choice of suitable media which accomplish the purposes of my invention.

And whereas my principal purpose has been to fortify moderately concentrated solutions of calcium cyanide in molten solvents, I may obviously employ my invention to fortify weak calcium cyanide solutions and I may indeed with a proper choice and arrangement of filtering media and/or calcium cyanamid, produce under proper temperature conditions high grade calcium cyanide by causing molten solvents to pass therethrough.

In lieu of calcium cyanamid itself I may employ calcium cyanamid forming reagents such as calcium carbide and nitrogen, preferably preheated, by causing the molten anhydrous solvent containing, if desired, the usual catalytic agents, such as $CaF_2$, simultaneously and under proper time and temperature regulation to contact the calcium carbide. In carrying out this purpose the molten anhydrous solvent and the nitrogen preferably move countercurrently through the column or bed of calcium carbide and, if desired, may be circulated in cyclic manner. It is believed by some investigators that calcium cyanide is the primary product resulting from the nitrification of calcium carbide but that this is unstable and is decomposed immediately according to the reaction $$Ca(CN)_2 = CaCN_2 + C$$

This viewpoint would accord with my theory that solution is essential to the stability of calcium cyanide and I wish therefore that my invention shall be given the broadest possible construction to include the production of calcium cyanide in stabilized condition directly from calcium carbide and nitrogen by causing these to react in the presence of or in contact with suitable molten anhydrous solvents for calcium cyanide.

What I claim is:

1. A method of treating cyanides which comprises producing calcium cyanide in the molten state in solution in a fused salt containing substantial quantities of insoluble or suspended impurities, passing the same through a filter medium maintained at a sufficiently high temperature to prevent solidification of the cyanide, whereby said medium removes such impurities from the cyanide.

2. A method of treating cyanides which comprises producing a cyanide in the molten state in solution in a fused salt containing substantial quantities of insoluble or suspended impurities including lime and carbon, passing the same through a filter medium maintained at a sufficiently high temperature to prevent solidification of the cyanide, whereby said medium removes such impurities from the cyanide.

3. A method of treating cyanides which comprises producing calcium cyanide in the molten state in solution in a fused salt containing substantial quantities of insoluble or suspended impurities, passing the same through a filter medium of granular carbon maintained at a sufficiently high temperature to prevent solidification of the cyanide, whereby said medium removes such impurities from the cyanide.

4. A method of treating cyanides which comprises producing a cyanide in the molten state in solution in a fused salt containing substantial quantities of insoluble or suspended impurities, passing the same through a filter medium of calcium cyanamid maintained at a sufficiently high temperature to prevent solidification of the cyanide, whereby said medium removes such impurities from the cyanide.

5. A method of treating cyanides which comprises producing calcium cyanide in the molten state in solution in a fused salt containing substantial quantities of insoluble or suspended impurities, passing the same through a filter medium maintained at a sufficiently high temperature to prevent solidification of the cyanide, heating the medium electrically to maintain said temperature, whereby said medium removes such impurities from the cyanide.

6. A method of treating cyanides which comprises producing a cyanide in the molten state in solution in a fused salt containing substantial quantities of insoluble or suspended impurities, passing the same through a plurality of media maintained at a sufficiently high temperature to prevent solidification of the cyanide, the first of said media being inert and the second being capable of reacting to produce additional cyanide.

7. A method of treating cyanides which comprises producing a cyanide in the molten state in solution in a fused salt containing substantial quantities of insoluble or suspended impurities, passing the same through a plurality of media maintained at a sufficiently high temperature to prevent solidification of the cyanide, the first of said media being carbon and the second being calcium cyanamid.

8. A method of treating cyanides which comprises producing a cyanide in the molten state in solution in a fused salt containing substantial quantities of insoluble or suspended impurities, passing the same through a plurality of media maintained at a sufficiently high temperature to prevent solidification of the cyanide, the first of said media being inert and the second being capable of reacting to produce additional cyanide, the second medium being maintained at a higher temperature than the first.

9. A method of treating cyanides which comprises producing a cyanide in the molten state in solution in a fused salt containing substantial quantities of insoluble or suspended impurities, passing the same through a filter medium maintained at a sufficiently high temperature to prevent solidification of the cyanide, whereby said medium removes such impurities from the cyanide, said medium comprising substances capable of racting to produce additional cyanide and thus being adapted to fortify the cyanide content of the mass.

10. A method of treating cyanides which comprises producing calcium cyanide in the molten state in solution in a fused salt and containing substantial quantities of insoluble or suspended impurities, passing the same through a filter medium maintained at a sufficiently high temperature to prevent solidification of the cyanide, whereby said medium removes such impurities from the cyanide, the resulting solution being substantially saturated with cyanide at the temperature of the operation.

11. An apparatus for treating cyanides which comprises a furnace for producing cyanide in the molten state, a plurality of sets of filters placed in proximity to the outlet from the furnace, and means for solidifying the cyanide.

12. An apparatus for treating cyanides which comprises a furnace for producing cyanide in the molten state, a filter placed in proximity to the outlet from the furnace, said filter being movably mounted with respect to said furnace, and means for solidifying the cyanide.

FRANK R. KEMMER.